United States Patent
Parks et al.

(10) Patent No.: US 12,291,088 B1
(45) Date of Patent: May 6, 2025

(54) GLARE REDUCTION DEVICE FOR A SUN VISOR

(71) Applicants: Judith D. Parks, Rock Island, TN (US); Rhonda Kay Parks, Rock Island, TN (US)

(72) Inventors: Judith D. Parks, Rock Island, TN (US); Rhonda Kay Parks, Rock Island, TN (US)

( * ) Notice: Subject to any disclaimer, the term of this patent is extended or adjusted under 35 U.S.C. 154(b) by 0 days.

(21) Appl. No.: 18/754,338

(22) Filed: Jun. 26, 2024

(51) Int. Cl.
 *B60J 3/02* (2006.01)
 *B62D 1/04* (2006.01)

(52) U.S. Cl.
 CPC .......... *B60J 3/0278* (2013.01); *B60J 3/0208* (2013.01); *B62D 1/046* (2013.01)

(58) Field of Classification Search
 CPC .............................. B60J 3/0878; B60J 3/0208
 See application file for complete search history.

(56) References Cited

U.S. PATENT DOCUMENTS

| | | |
|---|---|---|
| 4,090,732 A | 5/1978 | Vistitsky |
| 5,158,334 A * | 10/1992 | Felland ...................... B60J 3/04 160/370.21 |
| 5,213,389 A | 5/1993 | Loftis et al. |
| 5,964,494 A | 10/1999 | Miller |
| 6,139,084 A | 10/2000 | Miles |
| 6,616,209 B1 | 9/2003 | Muyo |
| 8,789,870 B1 | 7/2014 | Tolbert |
| 2002/0038960 A1 | 4/2002 | Rounds |
| 2002/0190537 A1 | 12/2002 | Sturt et al. |
| 2013/0278006 A1 | 10/2013 | Sanchez et al. |
| 2022/0118827 A1* | 4/2022 | Makhdoom ............ B60J 3/0208 |
| 2022/0213722 A1* | 7/2022 | Linden .................... E05B 85/10 |
| 2022/0269892 A1* | 8/2022 | Huang .................... G06V 20/56 |
| 2022/0410671 A1 | 12/2022 | McKnight |
| 2024/0217318 A1* | 7/2024 | Sharkey ................. B60J 3/0208 |
| 2024/0272319 A1* | 8/2024 | Kliegman .............. G01V 1/181 |

* cited by examiner

*Primary Examiner* — Imran K Mustafa
(74) *Attorney, Agent, or Firm* — Cramer Patent & Design, PLLC; Aaron R. Cramer

(57) ABSTRACT

A glare reduction device for a sun visor in a motor vehicle passenger compartment includes a sun visor with rotational and removable supports. The device features deployable right-side, bottom, and left-side glare shields, each made of glare-reducing material. A track system within the sun visor, driven by a bi-directional motor and gear reduction system, facilitates smooth deployment and retraction of the glare shields. The device is controlled by a code entry pad and an activation pushbutton located on the steering wheel. A main controller processes inputs and adjusts the glare shields dynamically based on real-time light conditions. An over-current protective device and a power source ensure safe operation. This device improves driving safety and visibility by reducing glare from various angles within the vehicle.

2 Claims, 5 Drawing Sheets

GLARE REDUCTION DEVICE FOR A SUN VISOR

RELATED APPLICATIONS

None.

FIELD OF THE DEVICE

The device of the present application falls under the category of automotive safety and convenience devices, specifically focusing on glare reduction systems for motor vehicles. These systems are designed to enhance driver visibility and comfort by mitigating the adverse effects of sunlight and other sources of glare on the driver's field of vision.

BACKGROUND OF THE DEVICE

Glare from sunlight or other bright light sources can significantly impair a driver's ability to see clearly, posing a substantial safety risk. Traditional sun visors provide some relief by blocking direct sunlight, but they are often insufficient, especially when sunlight enters the vehicle from angles not covered by the sun visor. Drivers frequently face challenges such as glare from the side windows, windshield edges, or reflections from the dashboard. Existing solutions, such as manual adjustments or aftermarket glare shields, often lack the convenience and adaptability needed for varying driving conditions.

The need for a more comprehensive and automated glare reduction system has led to the development of advanced solutions that incorporate sensors, motorized controls, and smart algorithms. These systems aim to provide dynamic glare reduction that adjusts in real-time to changing light conditions and driving scenarios. The present invention addresses these needs by offering an integrated glare reduction device that can be easily installed in motor vehicles, providing enhanced safety and convenience for drivers. The device leverages modern technology to offer an adaptive, automated solution that minimizes the need for manual adjustments and enhances overall driving safety.

SUMMARY OF THE DEVICE

Embodiments of the present disclosure may include a glare reduction device for a sun visor in a motor vehicle passenger compartment. This device includes a sun visor with a rotational support and a removable support. Additionally, it features a right-side glare shield, a bottom glare shield, and a left-side glare shield, each deployable from within the sun visor.

The device also includes a track system within the sun visor, defining a glare shield travel path for the deployment and retraction of the glare shields. A bi-directional motor, connected to the track system via a gear reduction system, drives the glare shields along the travel path. Each glare shield is made of a glare-reducing material.

The device includes a code entry pad for authorizing the deployment of the glare shields and an activation pushbutton located on the steering wheel for controlling the deployment and retraction. A main controller processes inputs from the code entry pad and activation pushbutton and controls the bi-directional motor. The device is powered by a power source and protected by an overcurrent protective device.

In some embodiments, the glare-reducing material may be polarized, providing clear viewing through the glare shields. The right-side glare shield is beneficial when using a rear-view mirror, while the bottom and left-side glare shields are useful for blocking glare from areas of the windshield not covered by the sun visor.

The track system, bi-directional motor, and gear reduction system are configured to provide smooth deployment and retraction of the glare shields. The device may also include an ambient light sensor within the motor vehicle passenger compartment to adjust the transparency of the glare-reducing material based on varying light conditions.

The main controller may be a single-board computer, such as a Raspberry Pi® or Arduino®. The code entry pad allows for secure initialization and control of the device by entering an authorization code. The power source is typically a vehicle battery, with the overcurrent protective device ensuring safety against electrical surges.

The activation pushbutton allows the operator to deploy the glare shields while keeping their hands on the steering wheel, minimizing distraction and enhancing driving safety. The device is designed for easy installation and can be provided as standard or optional equipment on new motor vehicles, or as an add-on kit for existing motor vehicles.

The main controller dynamically adjusts the deployment of the glare shields based on real-time data from a light intensity sensor array, considering vehicle orientation, time of day, and current weather conditions. The sun visor can be rotated ninety degrees and used against the side window when the removable support is disengaged, providing additional versatility in glare reduction.

The deployment of the glare shields provides a line of vision through the windshield without glare, thereby enhancing driving safety. The features of the device provide benefits such as improved safety, easy access to the activation pushbutton, high-quality glare-reducing material, proper location of the glare-reducing material on the line of vision, ability to relocate the sun visor to the side window, improved view of oncoming traffic during sun glare conditions, usability by passengers, and effectiveness in various driving environments including desert and snowy conditions. The device may be especially beneficial to elderly and handicapped individuals who may otherwise be unable to reach the sun visor or other glare reduction means within the vehicle.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
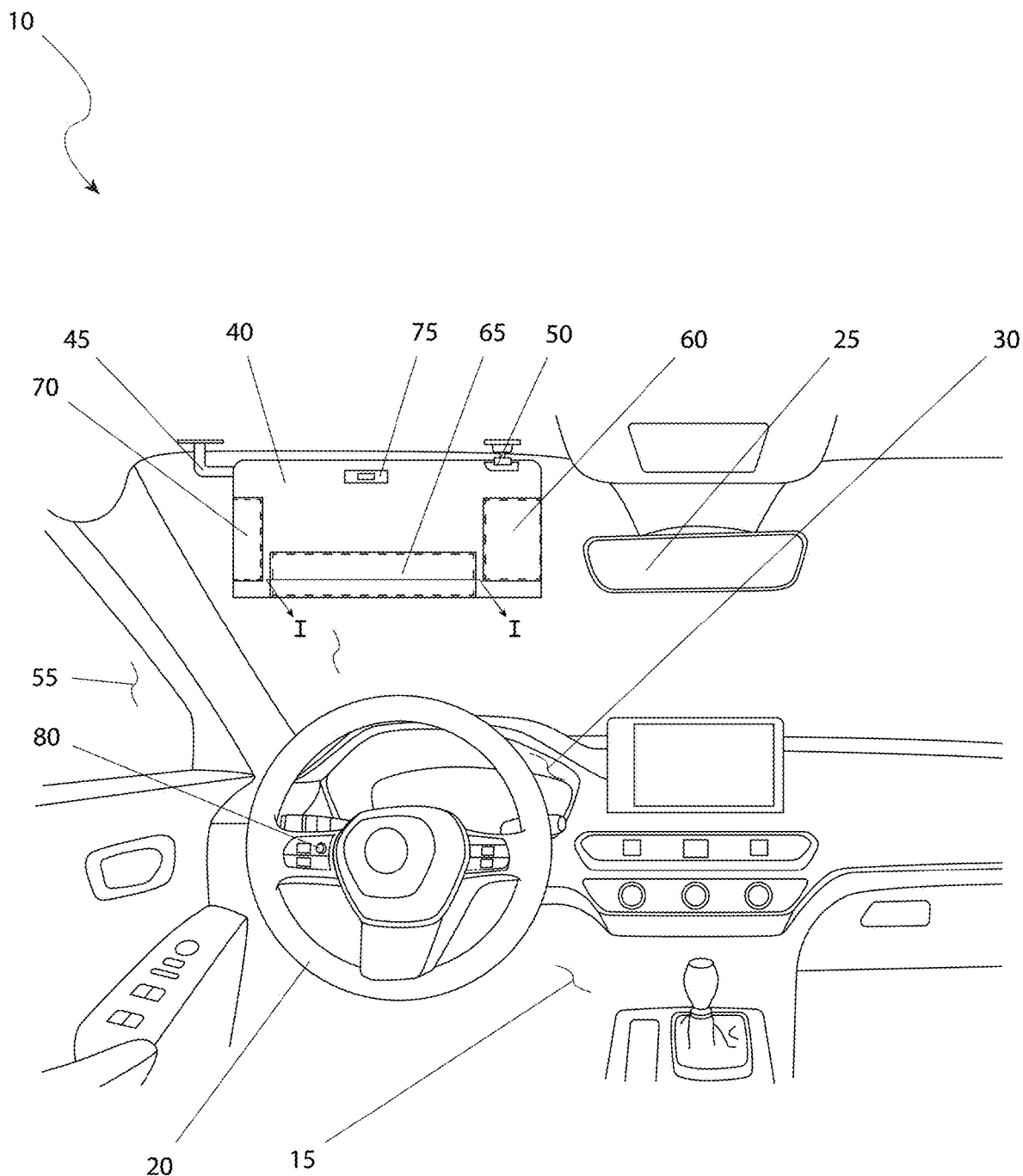
FIG. 1 is a perspective view of the glare reduction device 10 for a sun visor 40, in a retracted state in a motor vehicle passenger compartment 15, according to the preferred embodiment of the present device.

DESCRIPTIVE KEY 10 glare reduction device
15 motor vehicle passenger compartment
20 steering wheel
25 rearview mirror
30 dashboard
35 windshield
40 sun visor
45 rotational support
50 removable support
55 side window
60 right side glare shield
65 bottom glare shield
70 left side glare shield
75 code entry pad
80 activation pushbutton
85 glare reducing material
90 track system
95 glare shield travel path "a"
100 bi-directional motor
105 gear reduction system
110 motor vehicle
115 operator
120 line of vision
125 hand
130 power source
135 over current protective device
140 main controller

DESCRIPTION OF THE PREFERRED EMBODIMENTS

The best mode for carrying out the device is presented in terms of its preferred embodiment, herein depicted within FIGS. 1 through 5. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the glare reduction device 10 *a* for sun visor 40, in a retracted state in a motor vehicle passenger compartment 15, according to the preferred embodiment of the present device is disclosed. The glare reduction device (herein also described as the "device") 10, provides for three (3) remotely deployable glare reduction shields 60, 65, 70 for a sun visor 40 in a motor vehicle 110. The exemplary view discloses a typical motor vehicle passenger compartment 15 of the motor vehicle 110 complete, minimally with an expected steering wheel 20, a rearview mirror 25, a dashboard 30 and a windshield 35. While the motor vehicle passenger compartment 15 shown is that of a typical automobile, the teachings of the device 10 can be applied to any motor vehicle including truck, bus, recreational vehicle, van, or the like. As such, the use of the device 10 in any particular type of motor vehicle is not intended to be a limiting factor of the present device.

As also expected, a sun visor 40 is provided and supported by a rotational support 45 and a removable support 50. With the removable support 50 disengaged, the sun visor 40 may be rotated ninety-degrees (90°) and used against the side window 55 in an expected manner. The sun visor 40 is shown in a down, or deployed, condition for purposes of utilization. The sun visor 40 is equipped with a right-side glare shield 60, a bottom glare shield 65, and a left side glare shield 70, currently shown in a retracted state within the sun visor 40 and thus depicted by dashed lines due to their hidden state. Usage of the right-side glare shield 60, the bottom glare shield 65, and the left side glare shield 70 is authorized by code entry pad 75 located at the top of the sun visor 40. Deployment of the right-side glare shield 60, the bottom glare shield 65 and the left side glare shield 70, when authorized, will be by usage of an activation pushbutton 80, located on the steering wheel 20. Further detail on usage and operation of the code entry pad 75 and the activation pushbutton 80, will be provided herein below. It is noted that while only the driver's sun visor 40 is shown, the passenger sun visor 40 is of a similar and symmetrical design and equipped with the teachings of the device 10 as well. It is not shown for purposes of clarity.

Figure 2:
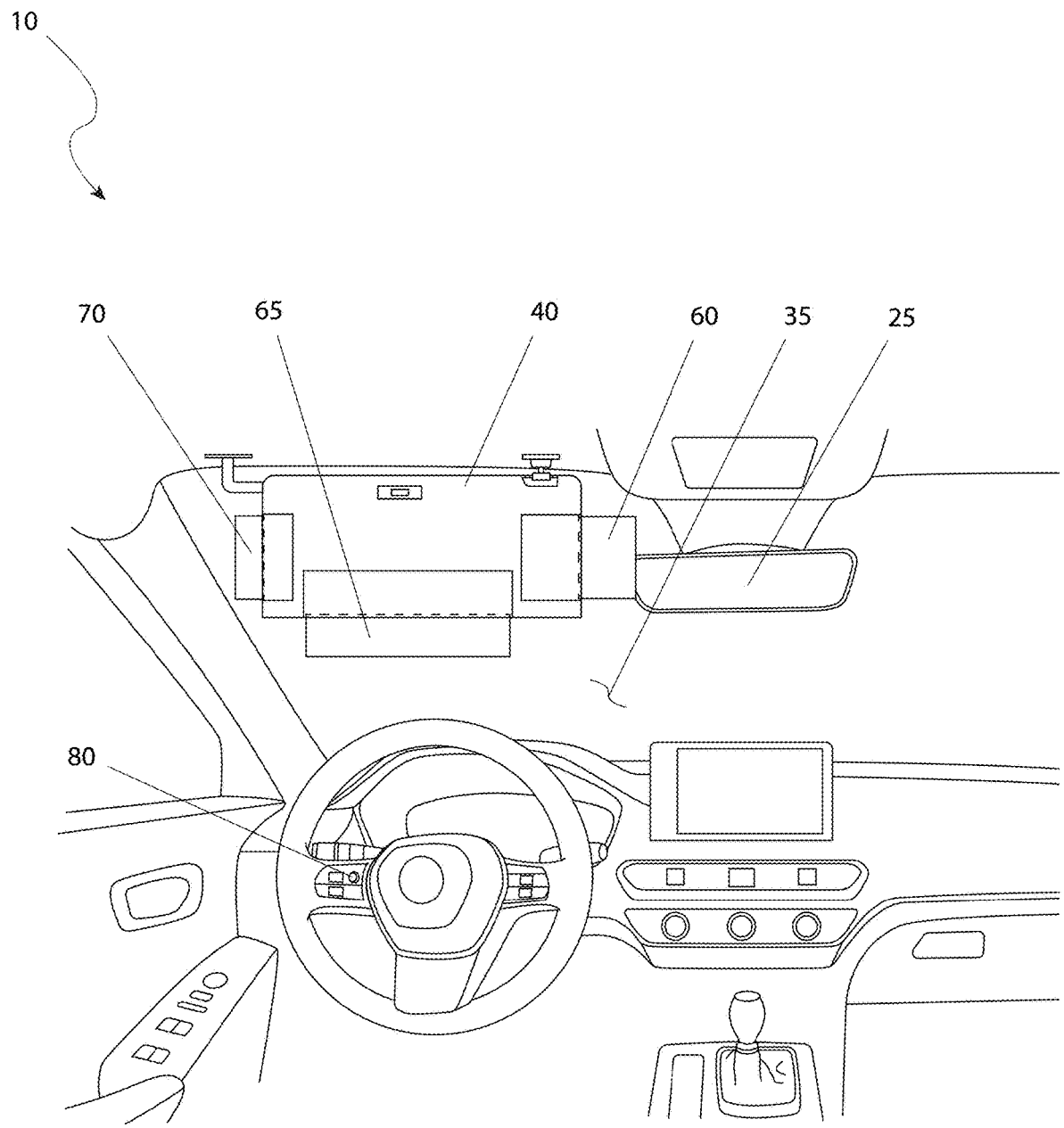
FIG. 2 is a perspective view of the glare reduction device 10 for a sun visor 40 in a deployed state in a motor vehicle passenger compartment 15, according to the preferred embodiment of the present device.

Referring next to FIG. 2, a perspective view of the device 10 in a deployed state from a sun visor 40 in a motor vehicle passenger compartment 15, according to the preferred embodiment of the present device is depicted. This view discloses the sun visor 40 in a downward or deployed condition as is required for utilization of the device 10. The right-side glare shield 60, the bottom glare shield 65, and the left side glare shield 70 are shown in a deployed or extended state, as controlled by the activation pushbutton 80. The right-side glare shield 60, the bottom glare shield 65 and the left side glare shield 70 would be made of a glare reducing material 85, perhaps polarized, and of the same material used by military in the desert, to provide clear precise viewing when looking through the glare reducing material 85, and thus a clear and safer view in which to drive. It is envisioned that the right-side glare shield 60 would be beneficial when using the rearview mirror 25, while the bottom glare shield 65 and left side glare shield 70 would be beneficial when looking through other areas of the windshield 35 not blocked by the body of the sun visor 40 itself.

Figure 3:
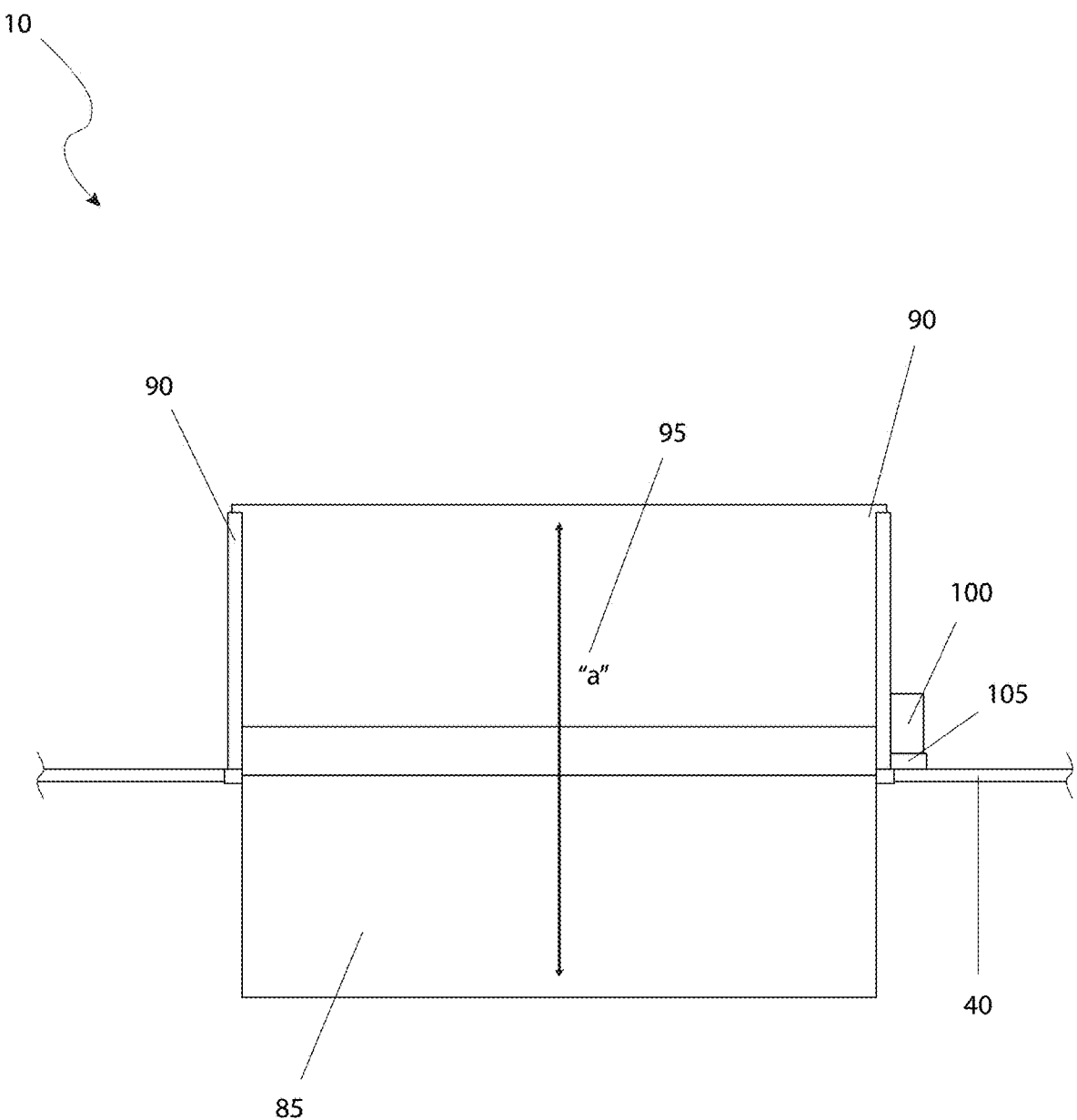
FIG. 3 is a sectional view of the glare reduction device 10 for a sun visor 40, as seen along a line I-I, as shown in FIG. 1, according to the preferred embodiment of the present device.

Referring now to FIG. 3, a sectional view of the device 10, as seen along a line I-I, as shown in FIG. 1, according to the preferred embodiment of the present device is shown. This view discloses a track system 90 on the interior of the sun visor 40. The glare reducing material 85 is driven in and out of the sun visor 40 along a glare shield travel path "a" 95 using a bi-directional motor 100 operating the track system 90 via a gear reduction system 105. Further detail on the operation of the bi-directional motor 100 will be provided herein below. It is noted that while the sectional view shown is that of the bottom glare shield 65 (as shown in FIGS. 1 and 2), the depiction would equally apply to that of right-side glare shield 60 and the left side glare shield 70 (both of which are as shown in FIGS. 1 and 2) in a typical manner.

Figure 4:
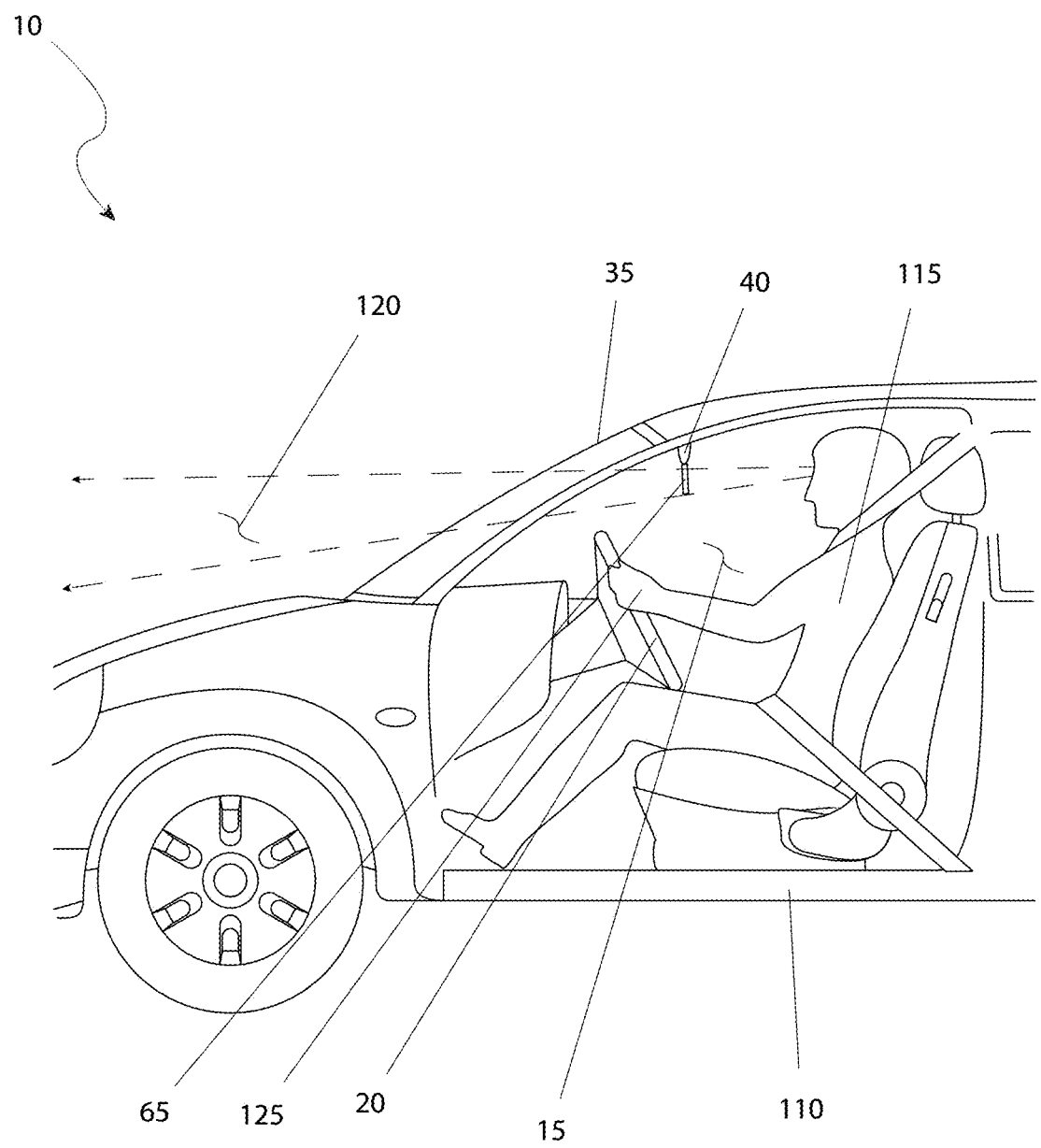
FIG. 4 is a side view of the glare reduction device 10 for a sun visor 40, shown in a utilized state, according to the preferred embodiment of the present device; and, FIG. 5 is an electrical block diagram of the glare reduction device 10 for a sun visor 40, according to the preferred embodiment of the present device.

Referring next to FIG. 4, a side view of the device 10, shown in a utilized state, according to the preferred embodiment of the present device is disclosed. This view discloses a the motor vehicle passenger compartment 15 inside of a motor vehicle 110. During utilization of the device 10, the operator 115 would place the sun visor 40 in a downward and deployed condition as shown and as typically expected. The sun visor 40 would be operation in and of itself in a typical manner without the right-side glare shield 60 and the left side glare shield 70 (as shown in FIGS. 1 and 2) and the bottom glare shield 65 deployed. The user would deploy the glare reducing material 85 by operation of the activation pushbutton 80 (as shown in FIGS. 1 and 2) on the steering wheel 20. This deployment would provide a line of vision 120 through the windshield 35 and the bottom glare shield 65. Such a feature would provide for glare free vision and thus easier and safer driving. Deployment of the right-side glare shield 60, the bottom glare shield 65 and the left side glare shield 70, by operation of the activation pushbutton 80 allow operator 115 who are unable to reach up and manually deploy the glare reducing material 85 or reach an activation means elsewhere in the motor vehicle passenger compartment 15. Additionally, as the hands 125 of the operator 115 remain on the steering wheel 20, distraction remains at a minimum and safer driving results.

Figure 5:
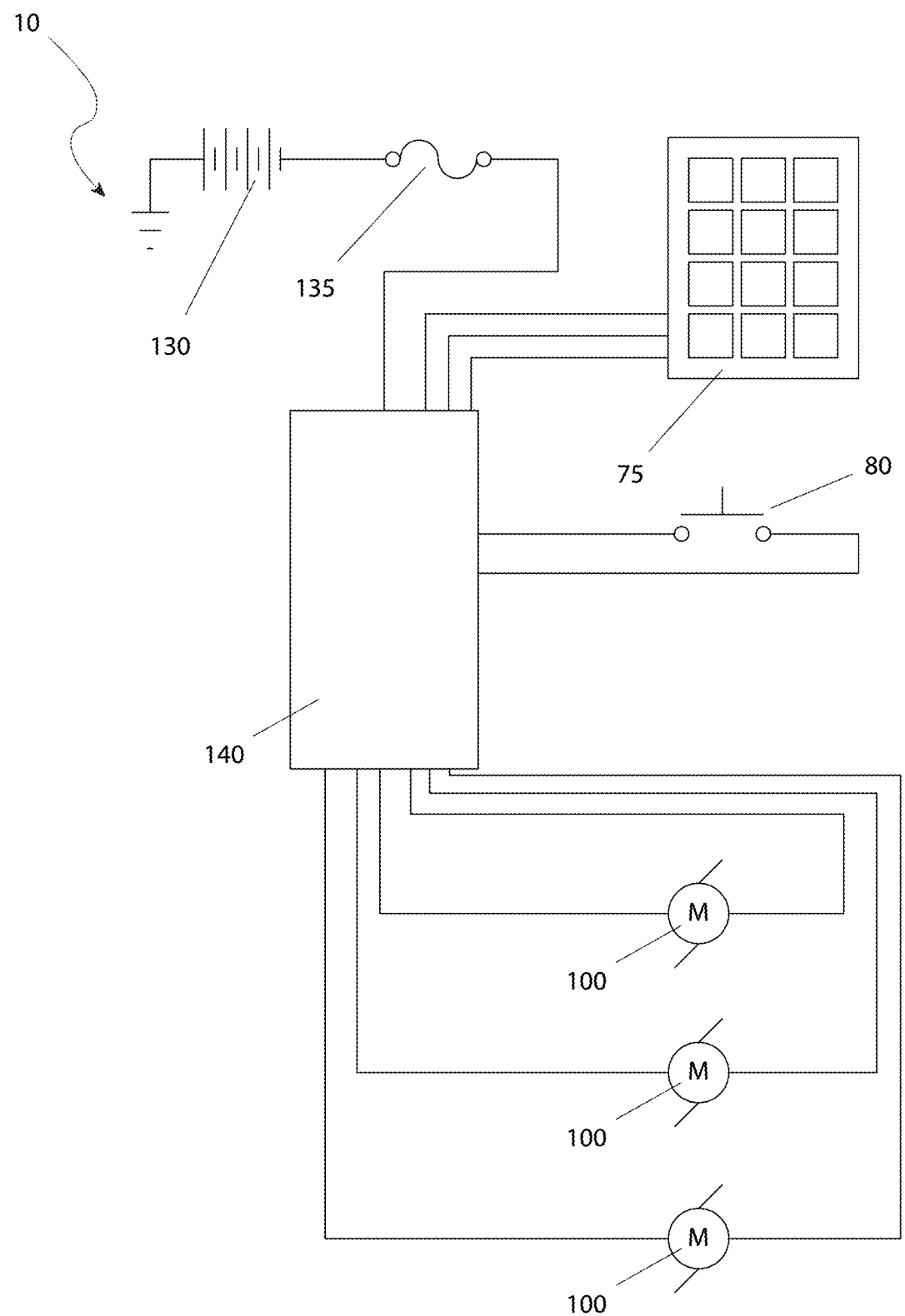

Referring to FIG. 5, an electrical block diagram of the device 10, according to the preferred embodiment of the present device. Power for the device 10 is derived from a power source 130, such as a vehicle battery (as shown). Resultant power is routed through an over current protective device 135 for safety. Power is the routed to a main controller 140 envisioned to be a single board computer (SBC) such as a Raspberry Pi®, Arduino®, or the like. Input functions are provided by the code entry pad 75 and the activation pushbutton 80. Upon initial purchase of the device 10, either as part of a motor vehicle 110 (as shown in FIG. 4) or as an aftermarket component, the operator 115 (as shown in FIG. 4) would be provided a code to enter into the code entry pad 75. This code would operate both the driver and passenger sun visor 40. The code would only be required to be entered once and would enable all who drive the motor vehicle 110 to utilize the functionality of the device 10. It is envisioned that usage of the device 10 would be beneficial to all who drive in sun glare conditions, but would be especially beneficial to the elderly and the handicapped, who may be otherwise unable to reach the sun visor 40. Output functionality of the main controller 140 would drive the three (3) bi-directional motor 100 for the right-side glare shield 60, the bottom glare shield 65, and the left side glare shield 70 (all of which are as shown in FIGS. 1 and 2).

2. Operation of the Preferred Embodiment

The preferred embodiment of the present device can be utilized by the common user in a simple and effortless manner with little or no training. It is envisioned that the device 10 would be constructed in general accordance with FIG. 1 through FIG. 5. It is envisioned that the device would be provided as standard or optional equipment on new motor vehicle 110 as well as being made available as an add-on kit for an existing motor vehicle 110. The user would procure the device 10 from conventional procurement channels such as new motor vehicle dealerships in the instance of a pre-installed version of the device 10 or from hardware stores, home improvement stores, mechanical supply houses, mail order and internet supply houses and the like, for aftermarket versions of the device 10.

After procurement and prior to utilization, the sun visor 40 equipped with the device 10 would be connected to the rotational support 45 and the removable support 50 in a typical manner. The activation pushbutton 80 would be installed in the steering wheel 20 and the electrical power would be connected to the power source 130 through the over current protective device 135. An appropriate authorization code would be entered into the code entry pad 75 to enable the device 10. At this point in time, the device 10 is ready for use.

During utilization, should reduction of glare through the windshield 35 be desired, the operator 115 would lower the sun visor 40 in a conventional manner, the activation pushbutton 80 would be pressed, the three (3) bi-directional motor 100 would drive the glare reducing material 85 out along the glare shield travel path "a" 95 in the track system 90 via aid of the gear reduction system 105, the right side glare shield 60, the bottom glare shield 65, and the left side glare shield 70 would be deployed; and, the operator 115 would look through the appropriate glare reducing material 85 to produce a line of vision 120 without any glare, thus producing a safer driving experience for everyone in the motor vehicle 110, as well as those who share the road with the operator 115.

After use of the device 10, it may be retracted along the glare shield travel path "a" 95 by pressing the activation pushbutton 80 again. This operation would then continue in a cyclical and repeating manner as needed.

It is envisioned that the features of the device 10 will provide the following benefits: improved safety; easy access to the activation pushbutton 80; improved quality of the glare reducing material 85; proper location of the glare reducing material 85 on the line of vision 120, ability to relocate the sun visor 40 to the side window 55, improved view of oncoming traffic during sun glare conditions, usable by passenger as well, ideal for use in desert driving, or locations where sun glare can cause difficulty such as driving when sun is out and snow is on ground; and, glare reduction on all three (3) sides of the sun visor 40.

Referring now to another embodiment of the present device, the glare reduction device 10 consists of an advanced adaptive glare reduction system that integrates additional sensor-based functionality for enhanced user experience. This embodiment includes a light intensity sensor array strategically positioned around the windshield 35, side windows 55, and rearview mirror 25, to detect the direction and intensity of sunlight entering the motor vehicle passenger compartment 15. These sensors continuously feed data to the main controller 140, which dynamically adjusts the deployment of the right-side glare shield 60, bottom glare shield 65, and left-side glare shield 70 via the bi-directional motor 100 and gear reduction system 105. In this configuration, the device 10 also features a smart algorithm within the main controller 140 that anticipates and preemptively deploys the appropriate glare shields based on the vehicle's orientation, time of day, and current weather conditions, ensuring optimal glare reduction without requiring manual intervention from the operator 115. The sun visor 40, supported by the rotational support 45 and removable support 50, remains in its conventional location but with enhanced functionality. The operator 115 can still manually lower the sun visor 40 and activate the glare shields using the activation pushbutton 80 located on the steering wheel 20. The glare reducing material 85 is driven along the glare shield travel path "a" 95 within the track system 90 to ensure smooth deployment and retraction. The code entry pad 75 allows for secure initialization and control of the device 10, powered by the motor vehicle's power source 130 and protected by an over current protective device 135. Additionally, this embodiment incorporates an ambient light sensor within the motor vehicle passenger compartment 15 to adjust the transparency of the glare reducing material 85, ensuring that it provides the necessary glare reduction while maintaining adequate visibility under varying light conditions. This enhanced version of the device 10 aims to provide a seamless and intuitive driving experience by minimizing glare-related distractions, thereby improving safety and comfort for all passengers. The dashboard 30 and the steering wheel 20 facilitate easy access and visibility of the device 10, allowing the operator 115 to maintain their hands 125 on the steering wheel 20 while operating the device. The overall system ensures that the line of vision 120 remains clear of glare, providing a safer driving environment within the motor vehicle 110.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A glare reduction device for use with a sun visor in a motor vehicle, the glare reduction device comprising:
    a sun visor having a rotational support and a removable support, the sun visor configured to rotate and be positioned against a windshield or a side window;
    a right-side glare shield, a bottom glare shield, and a left-side glare shield, each glare shield being configured to deploy and retract along a respective travel path within the sun visor;
    a bi-directional motor connected to a gear reduction system and a track system, the track system defining the travel path for deployment and retraction of the right-side glare shield, the bottom glare shield, and the left-side glare shield;
    a glare reducing material forming part of each glare shield, the glare reducing material being polarized to provide clear viewing through the glare shields;
    an activation pushbutton located on a steering wheel, the activation pushbutton configured to control deployment and retraction of the glare shields while allowing the operator to maintain hands on the steering wheel;
    a code entry pad configured to authorize deployment of the glare shields;
    a main controller configured to process inputs from the activation pushbutton and the code entry pad, and to control operation of the bi-directional motor;
    a power source configured to supply power to the device; and,
    an over current protective device configured to protect the device's electrical components from electrical surges.

2. The glare reduction device of claim 1, further comprising:
    a light intensity sensor array positioned within a motor vehicle passenger compartment, the light intensity sensor array configured to detect the direction and intensity of light entering the passenger compartment; and,
    wherein the main controller dynamically adjusts deployment of the right-side glare shield, the bottom glare shield, and the left-side glare shield based on real-time data from the light intensity sensor array, the vehicle's orientation, and current light conditions to minimize glare within the operator's line of vision.

* * * * *